United States Patent
Moudgal et al.

(10) Patent No.: US 6,408,417 B1
(45) Date of Patent: Jun. 18, 2002

(54) METHOD AND APPARATUS FOR CORRECTING SOFT ERRORS IN DIGITAL DATA

(75) Inventors: Anuradha N. Moudgal, Fremont; Rick Hetherington, Pleasanton; Timothy G. Goldsbury, Fresno; John P. Petry, San Diego, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/376,702

(22) Filed: Aug. 17, 1999

(51) Int. Cl.[7] ............................................... G11C 29/00
(52) U.S. Cl. ........................................ 714/764; 714/763
(58) Field of Search .......................... 340/146; 714/761, 714/158, 763, 764, 747, 766; 395/182.04, 309

(56) References Cited

U.S. PATENT DOCUMENTS

| | | | | |
|---|---|---|---|---|
| 3,744,023 A | * | 7/1973 | Carpentier et al. | 340/146.1 |
| 4,604,750 A | * | 8/1986 | Manton et al. | 714/761 |
| 4,617,664 A | | 10/1986 | Aicheimann, Jr. et al. | 371/38 |
| 4,653,055 A | | 3/1987 | Miele et al. | 371/69 |
| 5,233,616 A | * | 8/1993 | Callander | 714/158 |
| 5,784,548 A | * | 7/1998 | Liong et al. | 395/182.04 |
| 5,881,256 A | * | 3/1999 | Lee | 395/309 |

FOREIGN PATENT DOCUMENTS

DE      3431770 A1     3/1986      G11C/29/00

OTHER PUBLICATIONS

Mikio Asakura, et al.; "An Experimental 1–Mbit Cache DRAM with ECC"; 25 (1990) Feb.; 8107 IEE Journal of Solid–State Circuits.

\* cited by examiner

*Primary Examiner*—David Ton
(74) *Attorney, Agent, or Firm*—John Schipper

(57) ABSTRACT

On data writes to a cache memory in a digital data processing system, the existing data currently stored on the desired cache storage line is read out and parity checked. The read-out data is modified with new data only if there is no parity error. If a parity error is detected, a cache miss is signaled and the read-out line of data is written back into the cache memory with error correction code checking and error correction being performed on the defective line of data as part of this write-back to the cache memory.

6 Claims, 5 Drawing Sheets

METHOD AND APPARATUS FOR CORRECTING SOFT ERRORS IN DIGITAL DATA

TECHNICAL FIELD

This invention related to methods and apparatus for correcting soft errors in digital data and is particularly useful for correcting soft errors in a computer memory.

BACKGROUND OF THE INVENTION

Data stored on modem day integrated circuit memory chips is subject to so-called "soft errors" caused by gamma rays, cosmic rays, alpha particles and other environmental factors. The passage of a gamma ray through a memory chip, for example, will sometimes cause a disturbance which is sufficient to reverse the binary state of a stored data bit. This is called a "soft" error because no permanent damage is done to the structure of the chip and the disturbed memory cell is thereafter completely reusable for storing data.

Soft errors are particularly bothersome for the case of small, high-speed cache memory chips. If store updates are made to a "dirty" cache regardless of the presence of soft errors, data integrity is soon lost, especially when the error is in the unmodified segment of the data. Left uncorrected, soft errors can turn into fatal double bit errors.

Various error correction methods have been proposed for correcting soft errors. One proposed method is to generate and include with each line of stored data a set of error correcting code bits which can be used to detect and locate a bit which has been changed as a result of a soft error event. As each line of data is subsequently read out of memory, all data bits including the error correcting code bits are decoded as a group and the decoder output indicates which, if any, data bit is in error. The data is corrected by reversing the binary state of the erroneous bit.

Unfortunately, this method of error correction is time consuming and adversely affects system performance and increases latency.

SUMMARY OF THE INVENTION

The present invention provides a solution to the data integrity problem without making a big compromise on latency and data throughput. In particular, error correction testing is not performed on every data sample or segment. It is performed only when necessary. A simple parity check is used to determine when error correction is needed.

For the case of data stored in a cache memory, for example, on data writes to the cache memory, the existing data currently stored on the desired cache storage line is read out and parity checked. The read-out data is modified with new data only if there is no parity error. If a parity error is detected, a cache miss is signaled and the read-out line of data is written back into the cache memory. Error correction code checking and error correction are performed on the defective line of data as part of this write-back to the cache memory.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DETAILED DESCRIPTION OF THE ILLUSTRATED EMBODIMENT

Figure 1:
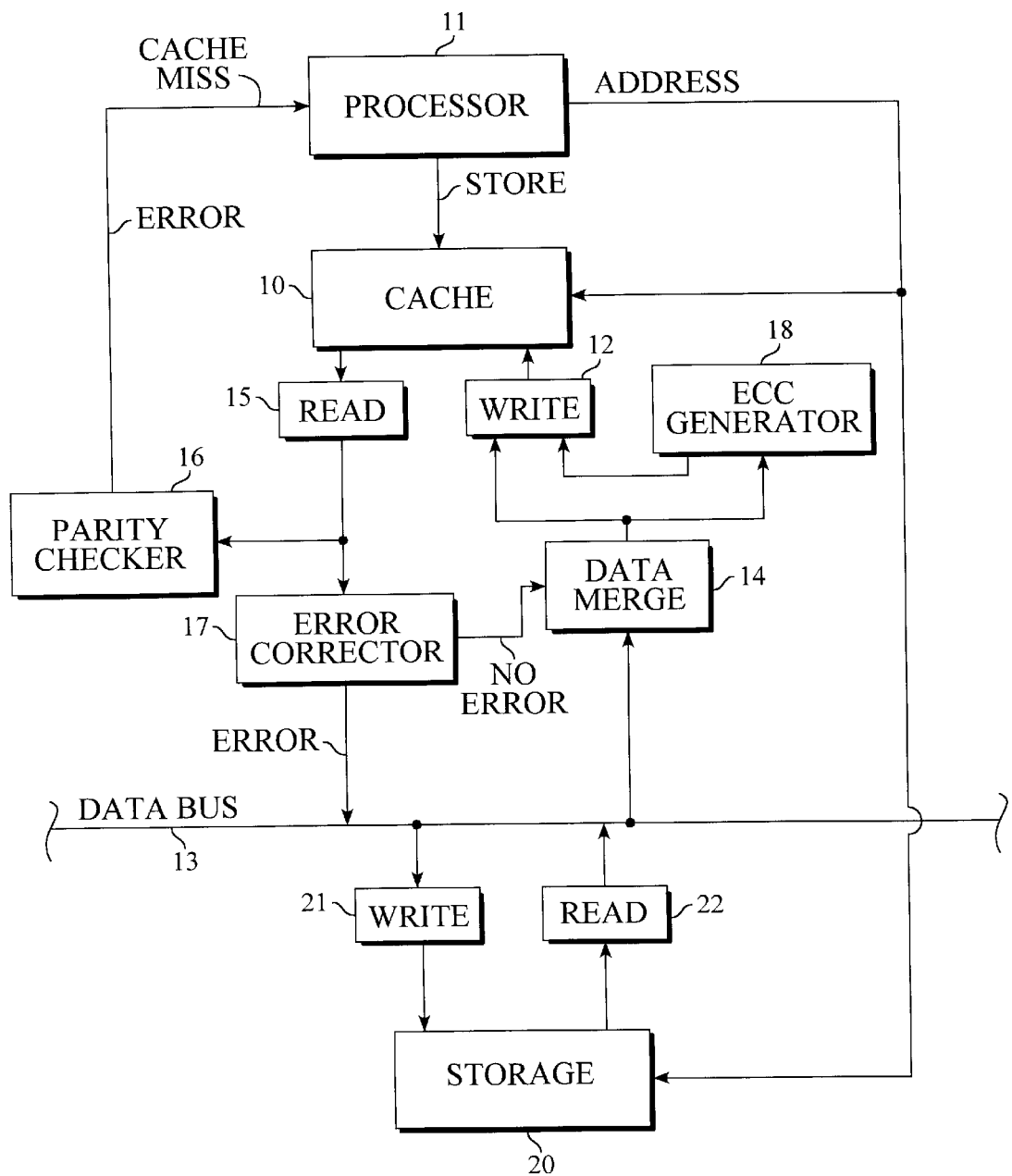
FIG. 1 is a block diagram of a portion of a data processing system showing a representative embodiment of the present invention.
Figure 2:
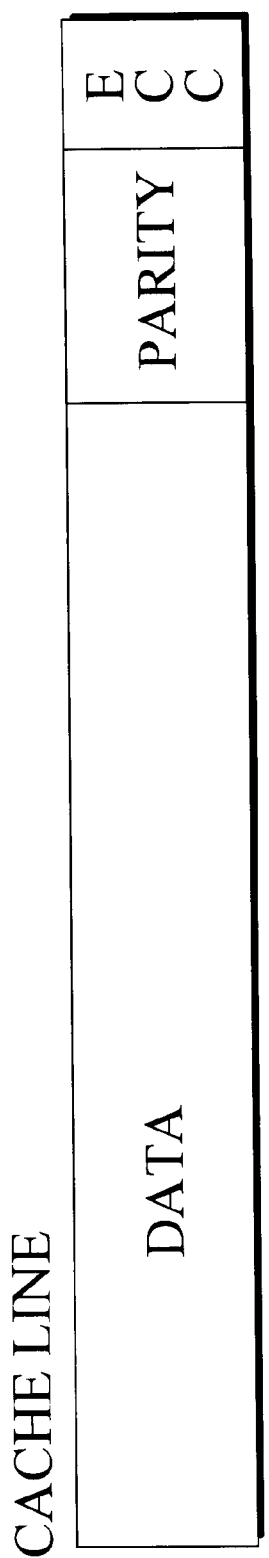
FIG. 2 is a diagram showing the contents of a line of data in the cache memory of FIG. 1.

Referring to FIG. 1, there is shown a portion of a digital data processing system which includes apparatus for correcting soft errors in a memory. The memory in question is represented by a cache memory 10. This cache memory 10 stores multiple lines of data, the composition of one line of which is shown in FIG. 2. The data field in FIG. 2 includes several bytes of data, typically four or eight. The parity field includes one parity check bit for each byte in the data field. The ECC (error correction code) field contains error correction code bits for the line as a whole. These ECC bits enable the position of an erroneous bit in the cache storage line to be determined.

The apparatus shown in FIG. 1 is manipulated and controlled by instructions and control signals issued by a digital data processor 11 which may, for example, take the form of a so-called "microprocessor". The apparatus of FIG. 1 further includes write circuitry 12 for writing lines of data into the cache 10, each such line of data having the composition shown in FIG. 2. This data is obtained from a data bus 13 and is supplied to the write circuitry 12 by way of data merge circuits 14. Read circuitry 15 is provided for reading out lines of data from the cache memory 10 and supplying same to the data bus 13. A parity checker 16 is coupled to the output of read circuitry 15 for checking the parity of each read-out byte and producing an error signal if a parity error is detected in any byte. This parity error signal is supplied to processor 11 as a "cache miss" signal which tells processor 11 that the attempted cache access failed. Selection of the particular storage line in cache 10 to be read or written is accomplished by an address signal supplied to cache 10 by processor 11.

The apparatus of FIG. 1 also includes an error corrector 17 for correcting data having a parity error and producing error-free corrected data. The data to be corrected is obtained from read circuitry 15 and the corrected data is supplied to write circuitry 12 for writing back into cache 10. An ECC (error correction code) generator 18 is provided for generating the ECC bits to be stored when a line of data is written into cache 10. ECC generator 18 examines the line of data supplied to write circuitry 12 and generates the appropriate ECC bits for storage in cache 10.

A further and larger memory unit or storage unit 20 is also coupled to the data bus 13 by way of its appropriate write circuitry 21 and read circuitry 22. Accessing of storage unit 20 is accomplished by way of address signals supplied by processor 11.

Figure 3:
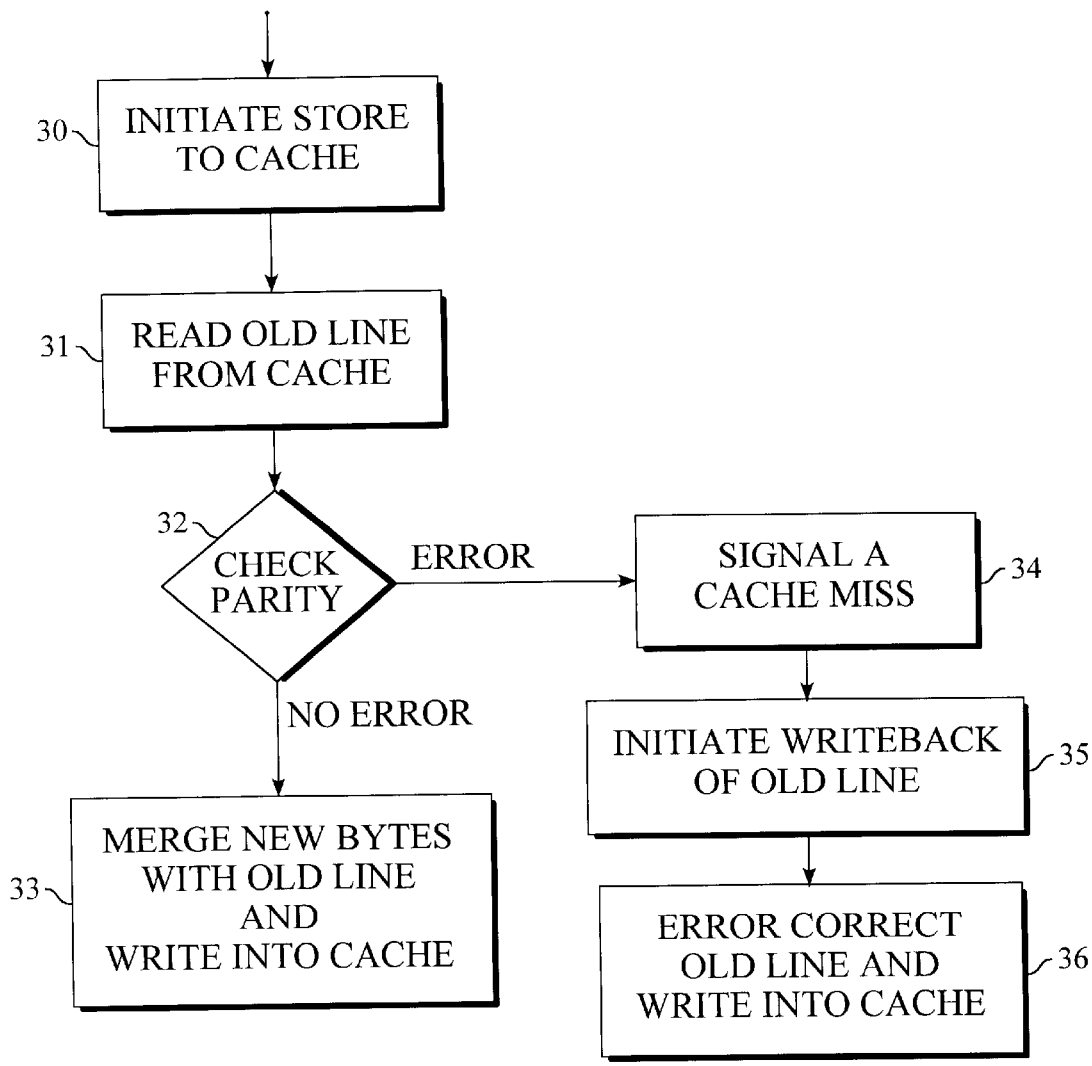
FIG. 3 is a flow chart showing the steps used for performing a representative embodiment of the present invention.

Referring to FIG. 3, there is shown a flow chart which explains a representative method for practicing the present invention. This method is used for correcting soft errors on writes to the cache 10. As indicated by block 30, processor 11 initiates a store to cache operation and sends an appropriate address to cache 10 for the particular cache line into which it is desired to write data. The next step, represented by block 31, is to read the existing data currently resident on the predetermined storage line which is addressed by processor 11. As indicated by block 32, parity checker 16 checks the parity of each byte of this existing data and produces a parity error signal if a parity error is detected for any byte of the existing data.

As indicated by block 33, if no parity error is detected, the new data byte or bytes which it is desired to store are merged with the existing data and the resulting merged data is written into the cache 10 at the same line address from which the existing data was obtained. This merging is accomplished by data merge circuits 14, the new data bytes being supplied thereto by way of data bus 13. The new bytes replace the existing bytes at the byte positions occupied by the new bytes. The resulting merged data is written into cache 10 by way of write circuitry 12. Following completion of a successful write, the ECC bits for the new line of data are generated by ECC generator 18 and stored in cache 10. These steps are represented by blocks 37 and 38 in FIG. 3.

If, on the other hand, a parity error is detected for the read-out line of data, then, as indicated by block 34, a cache miss is signaled to the processor 11 and no merging of new data occurs. The defective read-out line of data is corrected by error corrector 17 and is transferred to the storage unit 20. As indicated by block 35, processor 11 initiates a write-back of this defective line to the cache 10, such write-back being to the same cache line from which the defective data was obtained. As indicated by block 36, ECC checking and error correction occurs as part of this write-back. More particularly, the defective line of data is read from cache 10 and supplied to error corrector 17. In the present embodiment, error corrector 17 is a single-bit error corrector. As such, error corrector 17 does an ECC type decoding of the entire line of data including the ECC bits to determine the bit position of the erroneous bit. Error corrector 17 then reverses the binary state of the erroneous bit to thereby produce an error-free line of data. This corrected line of data is written into cache 10 at its previous address. In this manner, the soft error is corrected and processor 11 is free to re-initiate the aborted cache write request.

An advantage of the present invention is that the ECC error correction operation is performed only when needed. It is not performed on every write to cache, but only on those relatively infrequent occasions when a soft error is encountered. Thus, data integrity is maintained with a minimum impact on system performance and rate of data throughput. As a consequence, cache stores can be readily pipelined, if desired.

The simplicity of the present invention is noteworthy. A simple high-speed parity check is used to determine whether a more time-consuming error correction procedure should be performed.

Figure 4:
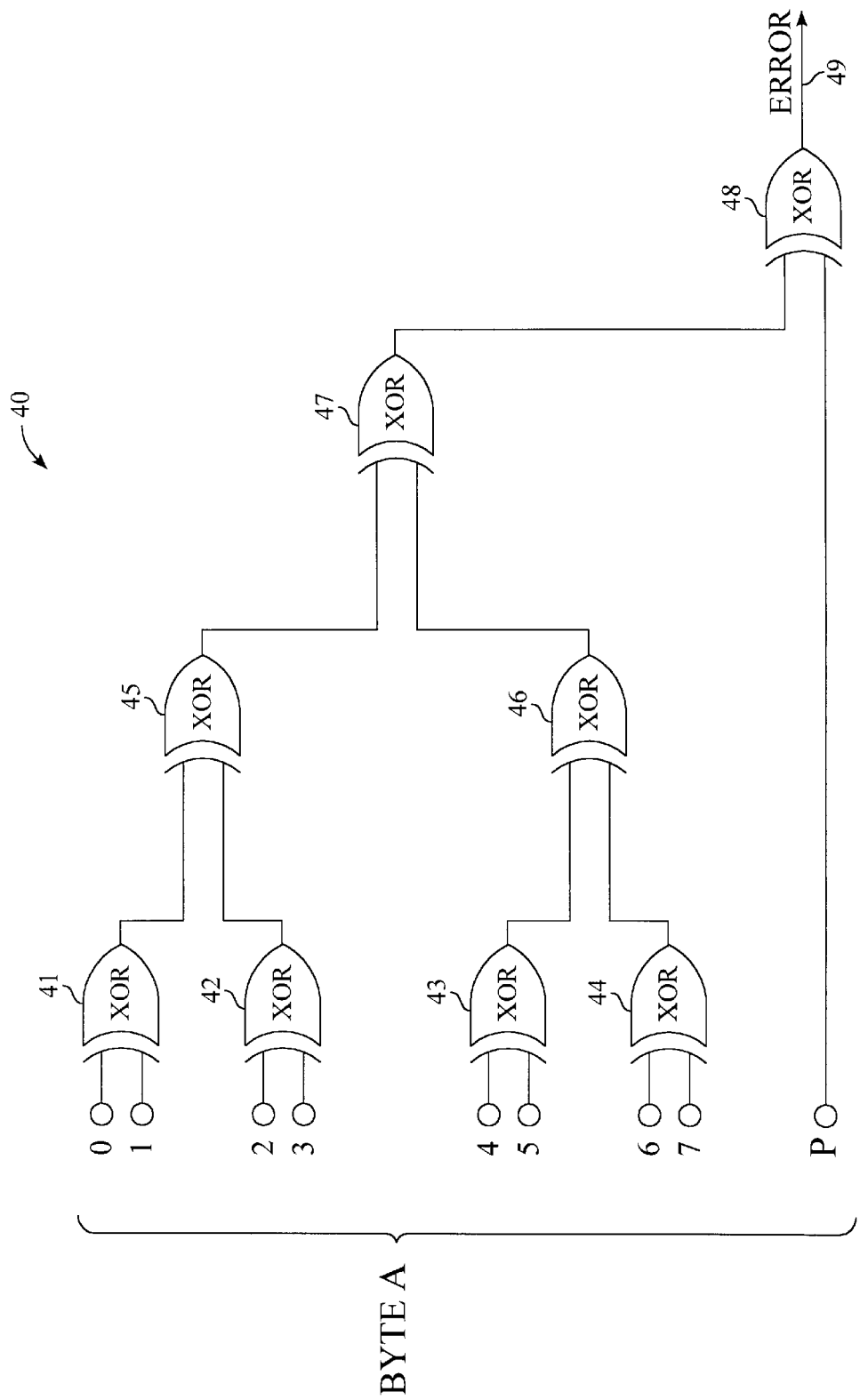
FIG. 4 is a schematic circuit diagram of an exclusive-OR circuit tree used in one embodiment of the parity checker of FIG. 1.

FIG. 4 shows an exclusive-OR circuit tree 40 which may be used in the parity checker 16 for checking the parity of a byte of data. Circuit tree 40 includes exclusive-OR circuits 41–48, with data bits 0–7 being supplied to XOR circuits 41–44 and the parity check bit P being supplied to XOR circuit 48. If the parity is wrong, an error signal is produced on output line 49. Additional XOR circuit trees, like the tree 40, are provided for the other bytes in the line of data read out of cache 10.

Figure 5:
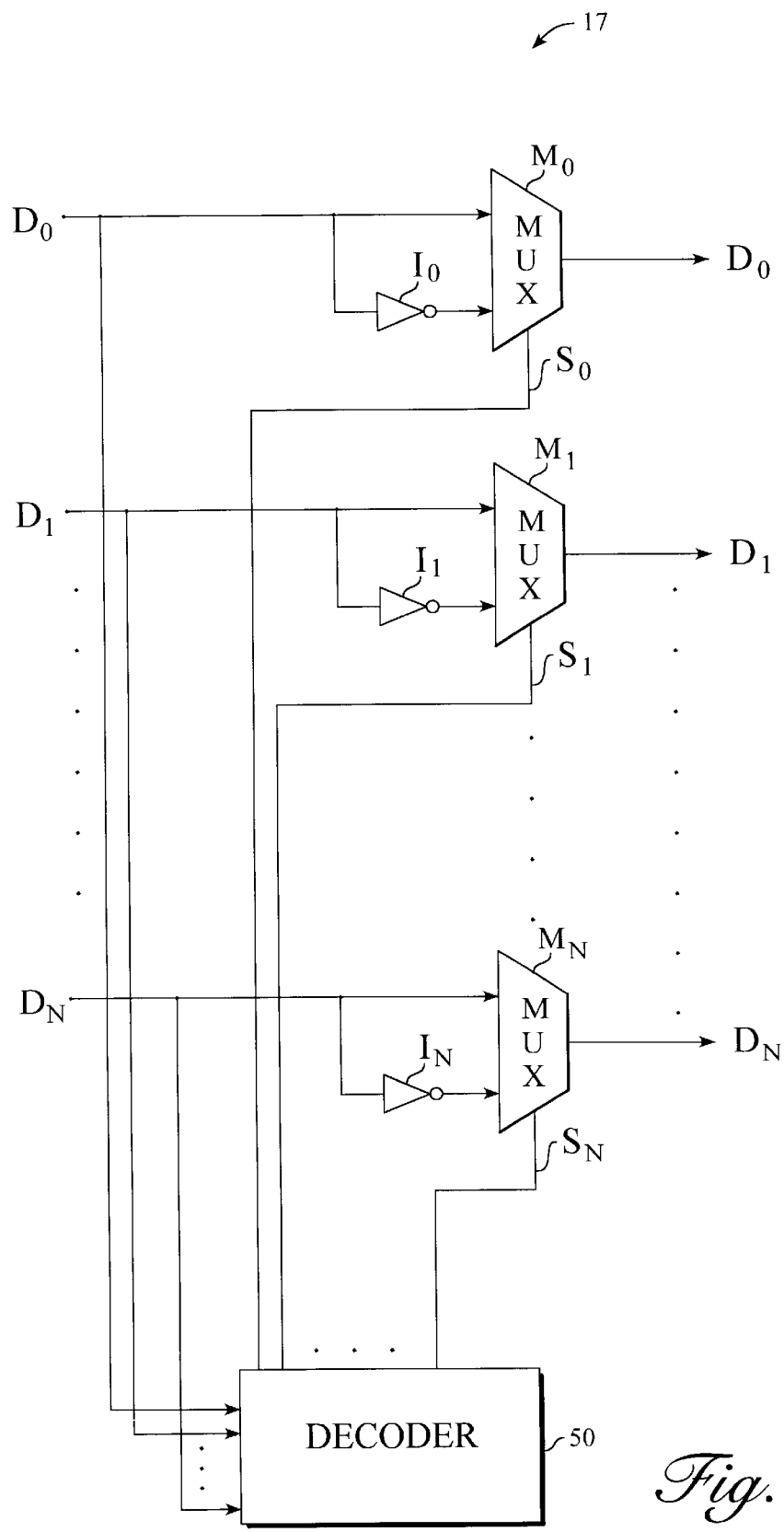
FIG. 5 is a schematic circuit diagram showing a representative form of construction for the error corrector of FIG. 1.

FIG. 5 shows a representative form of construction for the error corrector 17 of FIG. 1. The error corrector embodiment of FIG. 5 includes a set of multiplexer circuits $M_0, M_1, \ldots, M_N$ for individually reversing the binary states of different data bits. There is one multiplexer circuit for each bit in a cache line of data. These data bits are identified as $D_0, D_1, \ldots, D_N$. Each data bit D is supplied to a first input of its multiplexer. An inverter circuit "I" supplies an inverted replica of the data bit to the second input of the multiplexer. A switching signal S determines which one of the two inputs is allowed to pass through to the output line of the multiplexer. If the data bit is not erroneous, the non-inverted bit is passed to the multiplexer output. Conversely, if the data bit is erroneous, the inverted replica is passed to the multiplexer output. In this manner, the binary state of an erroneous data bit is reversed.

The error corrector of FIG. 5 further includes a decoder 50 for doing an ECC type decoding of the entire cache line of data including the ECC bits to determine the bit position of an erroneous bit. Decoder 50 has a set of switching signal output lines $S_0, S_1, \ldots, S_N$, there being one such output line for each bit in the cache line of data. These switching signal output lines run to respective ones of the multiplexers $M_0, M_1, \ldots, M_N$ for controlling the selection of the multiplexer inputs. If there is no erroneous D bit, all of the multiplexers will be set to select the non-inverted inputs. If, on the other hand, there is an erroneous D bit, the multiplexer for that D bit will be set by its S signal to select the inverted input.

While there has been described what is at present considered to be a preferred embodiment of this invention, it will be obvious to those skilled in the art that various changes and modifications may be made therein without departing from the invention and it is, therefore, intended to cover all such changes and modifications as come within the true spirit and scope of the invention.

What is claimed is:

1. A method of correcting an error in a data sample, the method comprising:
   receiving a specification of a line in a selected memory to which a new line of data is to be written;
   checking the parity of a data sample already present in the specified line;
   when parity error is detected in the data sample, performing an error correction and rewriting a corrected data sample to the specified line; and
   when no parity error is detected in the data sample, writing the new line of data into the specified line without performing error detection or correction.

2. The method of claim 1, further comprising using said new line of data in at least one further data processing operation.

3. The method of claim 1, further comprising providing, as said selected memory a cache memory.

4. The method of claim 1, further comprising:
   providing as said data sample a data segment including at least two bytes;
   performing said parity error on each byte in said data sample; and
   performing said error correction on the data segment, when said error is detected in at least one byte of the data segment.

5. A method of detecting and correcting an error in a data sample, the method comprising:

receiving a first data sample to be written to a computer data cache at a specified location;

reading a second data sample, including at least one data byte, at least one parity bit for each data byte and at least one error correction code bit for the second data sample, from the cache at the specified location;

checking the parity of at least one data byte for the second data sample;

when a parity error is detected, performing an error correction on the at least one data byte, using the error correction code bit, and replacing the incorrect at least one byte by a corrected at least one byte in the second data sample; and when no parity error is detected in the second data sample, writing the first data sample into the specified cache location without performing error detection or correction.

6. The method of claim 5, further comprising:

when no parity error is detected in the second data sample, allowing said first data sample to be read from the cache and used for at least one computer operation.

* * * * *